(12) United States Patent
Shen et al.

(10) Patent No.: US 11,159,589 B2
(45) Date of Patent: Oct. 26, 2021

(54) SYSTEM, METHOD, AND COMPUTER PROGRAM PRODUCT FOR TASK-BASED TELECONFERENCE MANAGEMENT

(71) Applicant: Visa International Service Association, San Francisco, CA (US)

(72) Inventors: Yi Shen, Fremont, CA (US); Trinath Anaparthi, Pleasanton, CA (US); Sangram Pattanaik, Hayward, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/553,917

(22) Filed: Aug. 28, 2019

(65) Prior Publication Data

US 2021/0067569 A1    Mar. 4, 2021

(51) Int. Cl.
*H04L 29/06*   (2006.01)
*H04L 12/26*   (2006.01)

(52) U.S. Cl.
CPC .......... *H04L 65/403* (2013.01); *H04L 43/08* (2013.01); *H04L 65/1066* (2013.01)

(58) Field of Classification Search
CPC .... H04L 65/403; H04L 65/1066; H04L 43/08
See application file for complete search history.

(56) References Cited

U.S. PATENT DOCUMENTS 6,463,414 B1 * 10/2002 Su ........................ G10L 19/173
                                                                704/207
6,697,858 B1 *  2/2004 Ezerzer ............... H04L 41/0893
                                                                370/231
6,807,563 B1 * 10/2004 Christofferson .... H04L 12/1822
                                                                709/204
6,876,734 B1 *  4/2005 Summers ............ H04L 12/1818
                                                                370/260
7,007,235 B1 *  2/2006 Hussein .............. H04L 12/1822
                                                                715/751

(Continued)

OTHER PUBLICATIONS

"Access Call Center Supervisor Dashboard—Dialpad", https://help.dialpad.com/hc/en-us/articles/115005546046-Access-Call-Center-Supervisor-Dashboard, archived May 29, 2019, accessed Feb. 12, 2020, 6 pages.

(Continued)

*Primary Examiner* — Blake J Rubin
(74) *Attorney, Agent, or Firm* — The Webb Law Firm

(57) ABSTRACT

Described are a system, method, and computer program product for task-based teleconference management. The method includes initiating a teleconference bridge and generating a teleconference session hosted by the bridge. The method also includes connecting teleconference participants of an organization to the bridge and receiving a participant identifier for each participant. The method further includes determining an association of an organization group with each participant based on a respective participant identifier. The method further includes generating display data configured to cause a computing device to display a control interface depicting: (i) the teleconference session having groups of participants, the groups selected from predetermined groups based on task data, and each participant visually associated which its group; and (ii) labels of each participant to identify the group associated therewith.

18 Claims, 7 Drawing Sheets

(56) References Cited

U.S. PATENT DOCUMENTS

| | | | |
|---|---|---|---|
| 7,185,054 B1* | 2/2007 | Ludwig | G06F 3/0482 |
| | | | 348/E7.081 |
| 7,599,964 B1* | 10/2009 | Bozek | G06Q 10/06 |
| 7,978,838 B2 | 7/2011 | Rodman et al. | |
| 8,346,589 B1* | 1/2013 | Norton | G06Q 10/1093 |
| | | | 705/7.18 |
| 8,352,802 B2* | 1/2013 | Katz | G06F 11/2294 |
| | | | 714/46 |
| 8,625,769 B1* | 1/2014 | Allen | 379/203.01 |
| 8,964,946 B1* | 2/2015 | Scheet | G10L 15/26 |
| | | | 379/88.01 |
| 9,319,442 B2* | 4/2016 | Griffin | H04L 65/1093 |
| 9,614,968 B2 | 4/2017 | Adderly et al. | |
| 10,257,360 B2 | 4/2019 | Schmitz et al. | |
| 2005/0254440 A1* | 11/2005 | Sorrell | H04L 29/06027 |
| | | | 370/264 |
| 2006/0010023 A1* | 1/2006 | Tromczynski | G06Q 10/1095 |
| | | | 705/7.25 |
| 2007/0133437 A1* | 6/2007 | Wengrovitz | H04M 3/56 |
| | | | 370/260 |
| 2007/0253424 A1* | 11/2007 | Herot | H04L 12/1818 |
| | | | 370/395.2 |
| 2010/0251127 A1* | 9/2010 | Geppert | H04L 65/1069 |
| | | | 715/735 |
| 2010/0306674 A1* | 12/2010 | Salesky | H04L 12/1813 |
| | | | 715/753 |
| 2011/0141951 A1* | 6/2011 | Ramachandran | H04L 12/1818 |
| | | | 370/263 |
| 2011/0225013 A1* | 9/2011 | Chavez | G06Q 10/109 |
| | | | 705/7.18 |
| 2012/0005278 A1* | 1/2012 | Muller | G06Q 10/1095 |
| | | | 709/206 |
| 2012/0150581 A1* | 6/2012 | McPhail | G06Q 10/109 |
| | | | 705/7.19 |
| 2013/0085785 A1* | 4/2013 | Rogers | G06Q 10/06 |
| | | | 705/4 |
| 2014/0067936 A1* | 3/2014 | Seligmann | H04L 12/1827 |
| | | | 709/204 |
| 2014/0270129 A1* | 9/2014 | Bracken | H04M 3/565 |
| | | | 379/202.01 |
| 2015/0092615 A1* | 4/2015 | Frankel | H04M 3/569 |
| | | | 370/260 |
| 2015/0149929 A1* | 5/2015 | Shepherd | H04L 65/403 |
| | | | 715/753 |
| 2016/0295167 A1* | 10/2016 | Sakurai | H04N 7/155 |
| 2017/0054770 A1* | 2/2017 | Wells | H04L 65/1006 |
| 2017/0357917 A1* | 12/2017 | Holmes | G06Q 10/06314 |
| 2018/0338119 A1* | 11/2018 | Hoffman | H04L 65/4015 |
| 2020/0174874 A1* | 6/2020 | Yamada | G06F 11/0778 |

OTHER PUBLICATIONS

"Better Call Management with Smart Conference Call Controls", Branded Bridgeline, https://brandedbridgeline.com/features/conference-call-management/, archived Mar. 29, 2019, accessed Feb. 12, 2020, 6 pages.

* cited by examiner

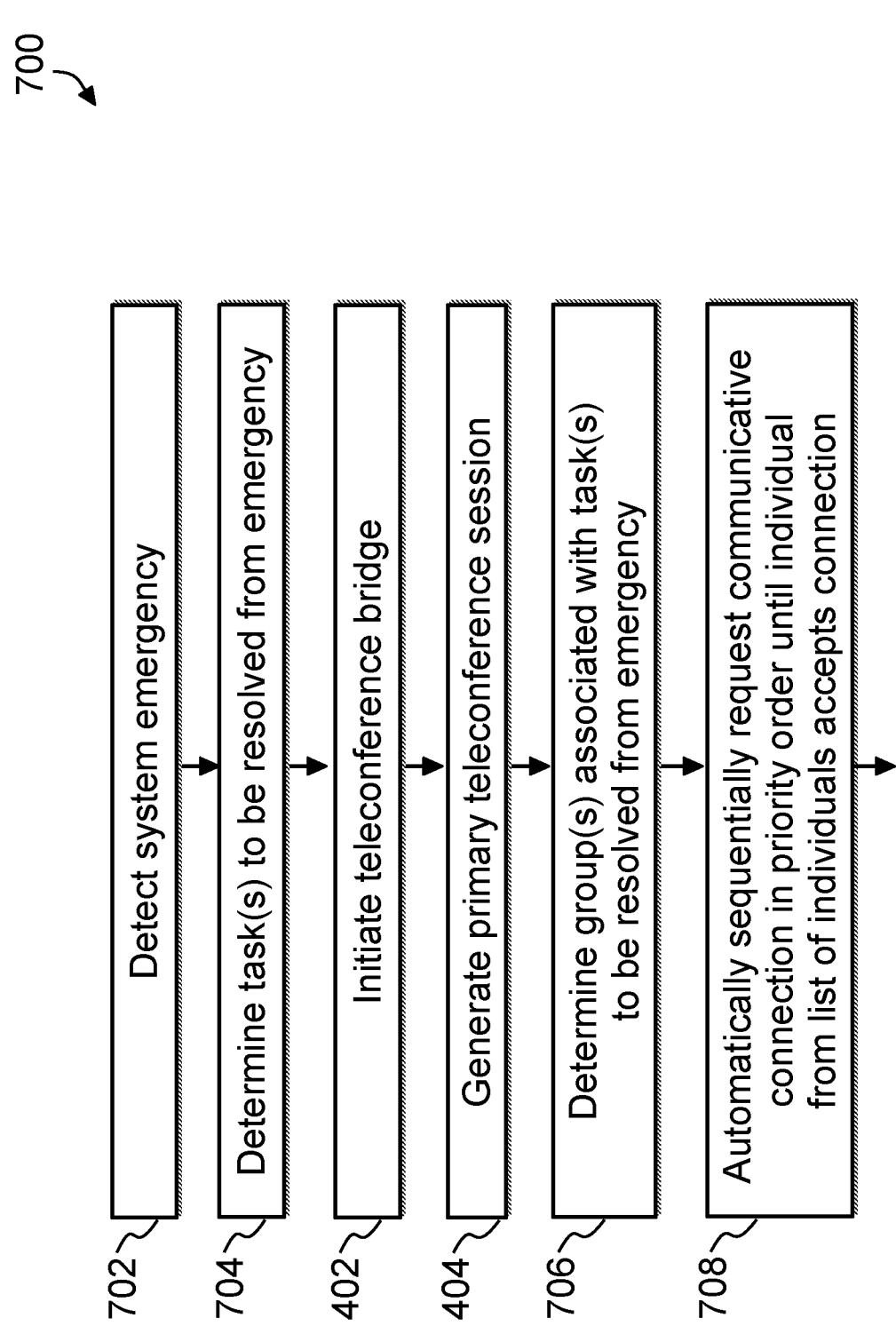

SYSTEM, METHOD, AND COMPUTER PROGRAM PRODUCT FOR TASK-BASED TELECONFERENCE MANAGEMENT

BACKGROUND

1. Technical Field

Disclosed embodiments or aspects relate generally to computer-networked teleconference systems and, in one particular embodiment or aspect, to a system, method, and computer program product for generating and managing a teleconference based on one or more tasks to be resolved.

2. Technical Considerations

One important use of teleconferencing systems is task resolution, particularly for resolving tasks created from an emergency event, e.g., a computer system service outage. When major incidents happen, being able to effectively manage and communicate with the right individuals is essential to mitigate problems, and in the case of a computer system service outage, essential to resume services without further loss of processing and service time. However, even after a teleconference bridge is initiated, it may be difficult to assess if connected teleconference participants represent individuals from all of the relevant groups (e.g., resource team) for resolving a particular task. Even if specific groups are abstractly identified, teleconference participants or a task manager may not know what individuals of an organization belong to the required groups, and if a group is unrepresented, whom to contact from that group. Moreover, when a large number of teleconference participants are communicating on a teleconference session, it becomes highly inefficient, unwieldly, or impossible to conduct side-conversations or break off into smaller groups of discussion, as would occur in a physical meeting of individuals to resolve a task; and, if side-conversations are conducted on another call, individuals not present may not be aware of what was discussed.

There is a need in the art for a system and method for generating and managing a teleconference based on one or more tasks to be resolved. There is a need for relevant groups for resolving a specific task to be automatically identified, and individuals participating on a teleconference to be organized and visually depicted by group. There is a further need for automatically identified tasks based on a type of emergency, for individuals to be automatically connected, and for conversations and participation to be logged based on group and channel of communication.

SUMMARY

Accordingly, and generally, provided are improved systems, methods, and computer program products for task-based conference management.

According to non-limiting embodiments or aspects, provided is a computer-implemented method. The method includes initiating, with at least one processor, a teleconference bridge. The method also includes generating, with at least one processor, a primary teleconference session hosted by the teleconference bridge. The method further includes connecting to the teleconference bridge, with at least one processor, a plurality of teleconference participants from a plurality of individuals of an organization. The method further includes receiving, with at least one processor, a plurality of participant identifiers including a participant identifier for each of the plurality of teleconference participants. The method further includes determining, with at least one processor, an association of at least one group of a plurality of predetermined groups of the organization with each of the plurality of teleconference participants based at least partly on the plurality of participant identifiers. The method further includes generating, with at least one processor, display data configured to cause a computing device to display a control interface depicting: (i) the primary teleconference session having a set of groups of teleconference participants, the set of groups selected from the plurality of predetermined groups based on task data, and each of the plurality of teleconference participants represented in the set of groups based on the at least one group with which the teleconference participant is associated; and (ii) labels of each of the plurality of teleconference participants distinguished visually to identify the at least one group associated with the teleconference participant.

In some non-limiting embodiments or aspects, the method may include, in response to input by a teleconference manager, generating, with at least one processor, a secondary teleconference session including a subset of the plurality of teleconference participants. The method may also include generating, with at least one processor, display data configured to cause the control interface to depict the secondary teleconference session including the subset of the plurality of teleconference participants.

In some non-limiting embodiments or aspects, the method may include recording, with at least one processor, primary audio data of the primary teleconference session and secondary audio data of the secondary teleconference session. The method may also include storing, with at least one processor, the primary audio data in association with the secondary audio data. The method may further include generating, with at least one processor, display data configured to cause the control interface to depict visual representations of the primary audio data and the secondary audio data in association with depictions of the primary teleconference session and the secondary teleconference session, respectively. The method may further include, in response to a user input, playing back, with at least one processor, the primary audio data, the secondary audio data, or a combination thereof.

In some non-limiting embodiments or aspects, the method may include identifying, with at least one processor, at least one group of the set of groups including no teleconference participants. The method may also include determining, with at least one processor, at least one individual of the plurality of individuals of the organization associated with the at least one group. The method may further include, connecting, with at least one processor, the at least one individual as a new teleconference participant to the primary teleconference session.

In some non-limiting embodiments or aspects, the method may include detecting, with at least one processor, a system emergency. The method may also include determining, with at least one processor, at least one task to be resolved based on the system emergency. The method may further include, in response to detecting the system emergency, generating, with at least one processor, the primary teleconference session and connecting the plurality of teleconference participants.

In some non-limiting embodiments or aspects, the at least one task to be resolved may be determined from a plurality of predetermined tasks and may be associated with at least one group of the plurality of predetermined groups of the organization. Each of the at least one group may be associated with a list of individuals of the plurality of individuals to be connected to the teleconference bridge in priority order.

In some non-limiting embodiments or aspects, in response to detecting the system emergency, automatically sequentially requesting, with at least one processor and in priority order, a communicative connection to an individual of a respective list of individuals for each group of the at least one group until an individual in the respective list of individuals accepts the communicative connection.

According to non-limiting embodiments or aspects, provided is a system including a server including at least one processor. The server is programmed and/or configured to initiate a teleconference bridge. The server is also programmed and/or configured to generate a primary teleconference session hosted by the teleconference bridge. The server is further programmed and/or configured to connect to the teleconference bridge a plurality of teleconference participants from a plurality of individuals of an organization. The server is further programmed and/or configured to receive a plurality of participant identifiers including a participant identifier for each of the plurality of teleconference participants. The server is further programmed and/or configured to determine an association of at least one group of a plurality of predetermined groups of the organization with each of the plurality of teleconference participants based at least partly on the plurality of participant identifiers. The server is further programmed and/or configured to generate display data configured to cause a computing device to display a control interface depicting: (i) the primary teleconference session having a set of groups of teleconference participants, the set of groups selected from the plurality of predetermined groups based on task data, and each of the plurality of teleconference participants represented in the set of groups based on the at least one group with which the teleconference participant is associated; and (ii) labels of each of the plurality of teleconference participants distinguished visually to identify the at least one group associated with the teleconference participant.

In some non-limiting embodiments or aspects, the server may be further programmed and/or configured to, in response to input by a teleconference manager, generate a secondary teleconference session including a subset of the plurality of teleconference participants. The server may be further programmed and/or configured to generate display data configured to cause the control interface to depict the secondary teleconference session including the subset of the plurality of teleconference participants.

In some non-limiting embodiments or aspects, the server may be further programmed and/or configured to identify at least one group of the set of groups including no teleconference participants. The server may be further programmed and/or configured to determine at least one individual of the plurality of individuals of the organization associated with the at least one group. The server may be further programmed and/or configured to connect the at least one individual as a new teleconference participant to the primary teleconference session.

In some non-limiting embodiments or aspects, the server may be further programmed and/or configured to detect a system emergency. The server may be further programmed and/or configured to determine at least one task to be resolved based on the system emergency. The server may be further programmed and/or configured to, in response to detecting the system emergency, generate the primary teleconference session and connect the plurality of teleconference participants.

In some non-limiting embodiments or aspects, the at least one task to be resolved may be determined from a plurality of predetermined tasks and may be associated with at least one group of the plurality of predetermined groups of the organization. Each of the at least one group may be associated with a list of individuals of the plurality of individuals to be connected to the teleconference bridge in priority order.

In some non-limiting embodiments or aspects, the server may be further programmed and/or configured to, in response to detecting the system emergency, automatically sequentially request, in priority order, a communicative connection to an individual of a respective list of individuals for each group of the at least one group until an individual in the respective list of individuals accepts the communicative connection.

According to non-limiting embodiments or aspects, provided is a computer program product for task-based teleconference management. The computer program product includes at least one non-transitory computer-readable medium including program instructions that, when executed by at least one processor, cause the at least one processor to initiate a teleconference bridge. The program instructions further cause the at least one processor to generate a primary teleconference session hosted by the teleconference bridge. The program instructions further cause the at least one processor to connect to the teleconference bridge a plurality of teleconference participants from a plurality of individuals of an organization. The program instructions further cause the at least one processor to receive a plurality of participant identifiers including a participant identifier for each of the plurality of teleconference participants. The program instructions further cause the at least one processor to determine an association of at least one group of a plurality of predetermined groups of the organization with each of the plurality of teleconference participants based at least partly on the plurality of participant identifiers. The program instructions further cause the at least one processor to generate display data configured to cause a computing device to display a control interface depicting: (i) the primary teleconference session having a set of groups of teleconference participants, the set of groups selected from the plurality of predetermined groups based on task data, and each of the plurality of teleconference participants represented in the set of groups based on the at least one group with which the teleconference participant is associated; and (ii) labels of each of the plurality of teleconference participants distinguished visually to identify the at least one group associated with the teleconference participant.

In some non-limiting embodiments or aspects, the program instructions may further cause the at least one processor to, in response to input by a teleconference manager, generate a secondary teleconference session including a subset of the plurality of teleconference participants. The program instructions may further cause the at least one processor to generate display data configured to cause the control interface to depict the secondary teleconference session including the subset of the plurality of teleconference participants.

In some non-limiting embodiments or aspects, the program instructions may further cause the at least one processor to record primary audio data of the primary teleconference session and secondary audio data of the secondary teleconference session. The program instructions may further cause the at least one processor to store the primary audio data in association with the secondary audio data. The program instructions may further cause the at least one processor to generate display data configured to cause the control interface to depict visual representations of the primary audio data and the secondary audio data in association with depictions of the primary teleconference session and the secondary teleconference session, respectively. The program instructions may further cause the at least one processor to, in response to a user input, play back the primary audio data, the secondary audio data, or a combination thereof.

In some non-limiting embodiments or aspects, the program instructions may further cause the at least one processor to identify at least one group of the set of groups including no teleconference participants. The program instructions may further cause the at least one processor to determine at least one individual of the plurality of individuals of the organization associated with the at least one group. The program instructions may further cause the at least one processor to connect the at least one individual as a new teleconference participant to the primary teleconference session.

In some non-limiting embodiments or aspects, the program instructions may further cause the at least one processor to detect a system emergency. The program instructions may further cause the at least one processor to determine at least one task to be resolved based on the system emergency. The program instructions may further cause the at least one processor to, in response to detecting the system emergency, generate the primary teleconference session and connect the plurality of teleconference participants.

In some non-limiting embodiments or aspects, the at least one task to be resolved may be determined from a plurality of predetermined tasks and may be associated with at least one group of the plurality of predetermined groups of the organization. Each of the at least one group may be associated with a list of individuals of the plurality of individuals to be connected to the teleconference bridge in priority order.

In some non-limiting embodiments or aspects, the program instructions may further cause the at least one processor to, in response to detecting the system emergency, automatically sequentially request, in priority order, a communicative connection to an individual of a respective list of individuals for each group of the at least one group until an individual in the respective list of individuals accepts the communicative connection.

Further non-limiting embodiments or aspects of the present disclosure will be set forth in the following numbered clauses:

Clause 1: A computer-implemented method, comprising: initiating, with at least one processor, a teleconference bridge; generating, with at least one processor, a primary teleconference session hosted by the teleconference bridge; connecting to the teleconference bridge, with at least one processor, a plurality of teleconference participants from a plurality of individuals of an organization; receiving, with at least one processor, a plurality of participant identifiers comprising a participant identifier for each of the plurality of teleconference participants; determining, with at least one processor, an association of at least one group of a plurality of predetermined groups of the organization with each of the plurality of teleconference participants based at least partly on the plurality of participant identifiers; and generating, with at least one processor, display data configured to cause a computing device to display a control interface depicting: (i) the primary teleconference session having a set of groups of teleconference participants, the set of groups selected from the plurality of predetermined groups based on task data, and each of the plurality of teleconference participants represented in the set of groups based on the at least one group with which the teleconference participant is associated; and (ii) labels of each of the plurality of teleconference participants distinguished visually to identify the at least one group associated with the teleconference participant.

Clause 2: The method of clause 1, further comprising: in response to input by a teleconference manager, generating, with at least one processor, a secondary teleconference session including a subset of the plurality of teleconference participants; and generating, with at least one processor, display data configured to cause the control interface to depict the secondary teleconference session including the subset of the plurality of teleconference participants.

Clause 3: The method of clause 1 or 2, further comprising: recording, with at least one processor, primary audio data of the primary teleconference session and secondary audio data of the secondary teleconference session; storing, with at least one processor, the primary audio data in association with the secondary audio data; generating, with at least one processor, display data configured to cause the control interface to depict visual representations of the primary audio data and the secondary audio data in association with depictions of the primary teleconference session and the secondary teleconference session, respectively; and in response to a user input, playing back, with at least one processor, the primary audio data, the secondary audio data, or a combination thereof.

Clause 4: The method of any of clauses 1-3, further comprising: identifying, with at least one processor, at least one group of the set of groups comprising no teleconference participants; determining, with at least one processor, at least one individual of the plurality of individuals of the organization associated with the at least one group; and connecting, with at least one processor, the at least one individual as a new teleconference participant to the primary teleconference session.

Clause 5: The method of any of clauses 1-4, further comprising: detecting, with at least one processor, a system emergency; determining, with at least one processor, at least one task to be resolved based on the system emergency; and in response to detecting the system emergency, generating, with at least one processor, the primary teleconference session and connecting the plurality of teleconference participants.

Clause 6: The method of any of clauses 1-5, wherein the at least one task to be resolved is determined from a plurality of predetermined tasks and is associated with at least one group of the plurality of predetermined groups of the organization, and wherein each of the at least one group is associated with a list of individuals of the plurality of individuals to be connected to the teleconference bridge in priority order.

Clause 7: The method of any of clauses 1-6, further comprising, in response to detecting the system emergency, automatically sequentially requesting, with at least one processor and in priority order, a communicative connection to an individual of a respective list of individuals for each group of the at least one group until an individual in the respective list of individuals accepts the communicative connection.

Clause 8: A system comprising a server comprising at least one processor, the server programmed and/or configured to: initiate a teleconference bridge; generate a primary teleconference session hosted by the teleconference bridge; connect to the teleconference bridge a plurality of teleconference participants from a plurality of individuals of an organization; receive a plurality of participant identifiers comprising a participant identifier for each of the plurality of teleconference participants; determine an association of at least one group of a plurality of predetermined groups of the organization with each of the plurality of teleconference participants based at least partly on the plurality of participant identifiers; and generate display data configured to cause a computing device to display a control interface depicting: (i) the primary teleconference session having a set of groups of teleconference participants, the set of groups selected from the plurality of predetermined groups based on task data, and each of the plurality of teleconference participants represented in the set of groups based on the at least one group with which the teleconference participant is associated; and (ii) labels of each of the plurality of teleconference participants distinguished visually to identify the at least one group associated with the teleconference participant.

Clause 9: The system of clause 8, wherein the server is further programmed and/or configured to: in response to input by a teleconference manager, generate a secondary teleconference session including a subset of the plurality of teleconference participants; and generate display data configured to cause the control interface to depict the secondary teleconference session including the subset of the plurality of teleconference participants.

Clause 10: The system of clause 8 or 9, wherein the server is further programmed and/or configured to: identify at least one group of the set of groups comprising no teleconference participants; determine at least one individual of the plurality of individuals of the organization associated with the at least one group; and connect the at least one individual as a new teleconference participant to the primary teleconference session.

Clause 11: The system of any of clauses 8-10, wherein the server is further programmed and/or configured to: detect a system emergency; determine at least one task to be resolved based on the system emergency; and in response to detecting the system emergency, generate the primary teleconference session and connect the plurality of teleconference participants.

Clause 12: The system of any of clauses 8-11, wherein the at least one task to be resolved is determined from a plurality of predetermined tasks and is associated with at least one group of the plurality of predetermined groups of the organization, and wherein each of the at least one group is associated with a list of individuals of the plurality of individuals to be connected to the teleconference bridge in priority order.

Clause 13: The system of any of clauses 8-12, wherein the server is further programmed and/or configured to, in response to detecting the system emergency, automatically sequentially request, in priority order, a communicative connection to an individual of a respective list of individuals for each group of the at least one group until an individual in the respective list of individuals accepts the communicative connection.

Clause 14: A computer program product comprising at least one non-transitory computer-readable medium including program instructions that, when executed by at least one processor, cause the at least one processor to: initiate a teleconference bridge; generate a primary teleconference session hosted by the teleconference bridge; connect to the teleconference bridge a plurality of teleconference participants from a plurality of individuals of an organization; receive a plurality of participant identifiers comprising a participant identifier for each of the plurality of teleconference participants; determine an association of at least one group of a plurality of predetermined groups of the organization with each of the plurality of teleconference participants based at least partly on the plurality of participant identifiers; and generate display data configured to cause a computing device to display a control interface depicting: (i) the primary teleconference session having a set of groups of teleconference participants, the set of groups selected from the plurality of predetermined groups based on task data, and each of the plurality of teleconference participants represented in the set of groups based on the at least one group with which the teleconference participant is associated; and (ii) labels of each of the plurality of teleconference participants distinguished visually to identify the at least one group associated with the teleconference participant.

Clause 15: The computer program product of clause 14, wherein the program instructions further cause the at least one processor to: in response to input by a teleconference manager, generate a secondary teleconference session including a subset of the plurality of teleconference participants; and generate display data configured to cause the control interface to depict the secondary teleconference session including the subset of the plurality of teleconference participants.

Clause 16: The computer program product of clause 14 or 15, wherein the program instructions further cause the at least one processor to: record primary audio data of the primary teleconference session and secondary audio data of the secondary teleconference session; store the primary audio data in association with the secondary audio data; generate display data configured to cause the control interface to depict visual representations of the primary audio data and the secondary audio data in association with depictions of the primary teleconference session and the secondary teleconference session, respectively; and in response to a user input, play back the primary audio data, the secondary audio data, or a combination thereof.

Clause 17: The computer program product of any of clauses 14-16, wherein the program instructions further cause the at least one processor to: identify at least one group of the set of groups comprising no teleconference participants; determine at least one individual of the plurality of individuals of the organization associated with the at least one group; and connect the at least one individual as a new teleconference participant to the primary teleconference session.

Clause 18: The computer program product of any of clauses 14-17, wherein the program instructions further cause the at least one processor to: detect a system emergency; determine at least one task to be resolved based on the system emergency; and in response to detecting the system emergency, generate the primary teleconference session and connect the plurality of teleconference participants.

Clause 19: The computer program product of any of clauses 14-18, wherein the at least one task to be resolved is determined from a plurality of predetermined tasks and is associated with at least one group of the plurality of predetermined groups of the organization, and wherein each of the at least one group is associated with a list of individuals of the plurality of individuals to be connected to the teleconference bridge in priority order.

Clause 20: The computer program product of any of clauses 14-19, wherein the program instructions further cause the at least one processor to, in response to detecting the system emergency, automatically sequentially request, in priority order, a communicative connection to an individual of a respective list of individuals for each group of the at least one group until an individual in the respective list of individuals accepts the communicative connection.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying figures, in which:

FIG. 7 is a process diagram of one embodiment or aspect of a system and method for task-based teleconference management.

DETAILED DESCRIPTION

Figure 1:
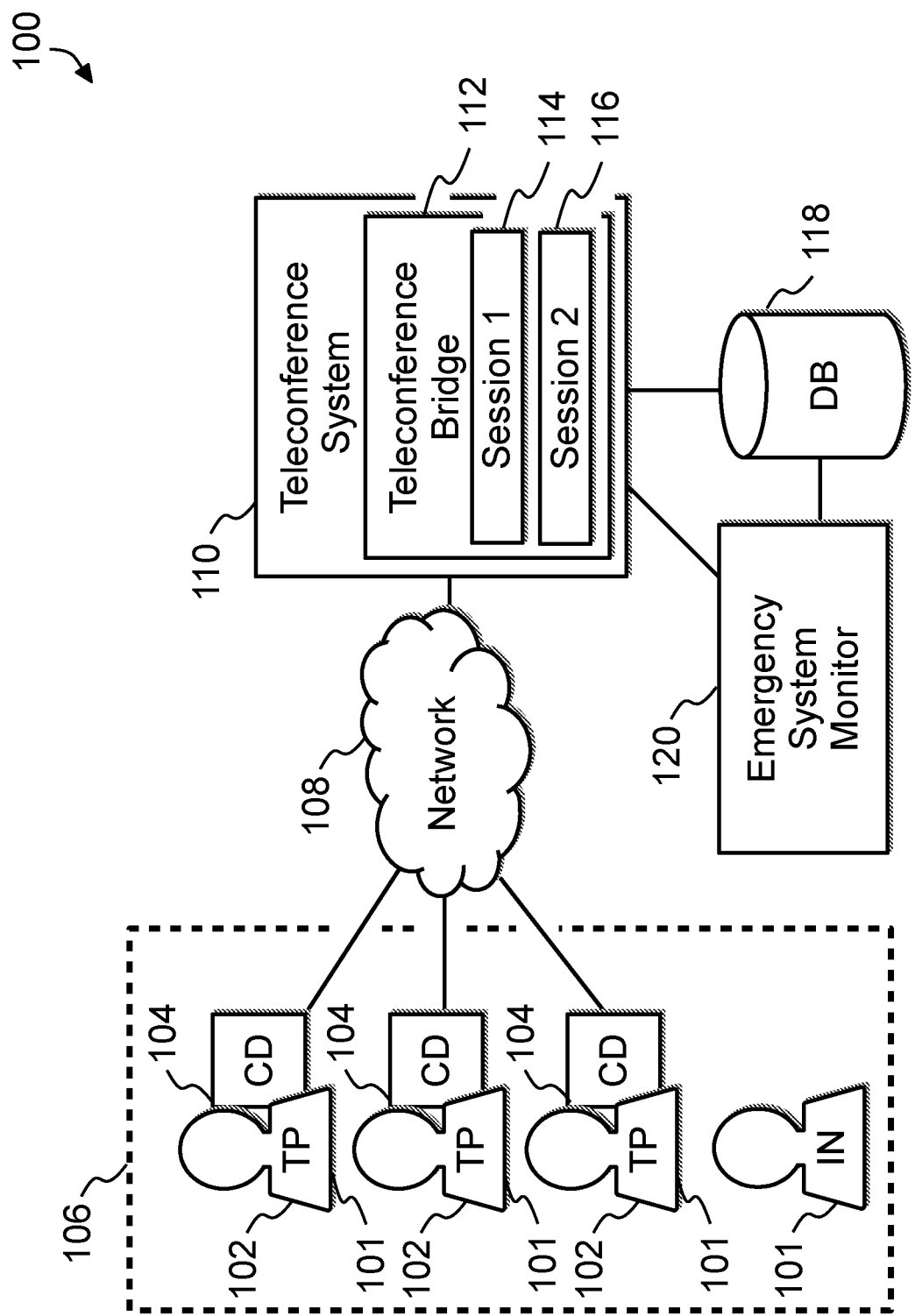
FIG. 1 is a schematic diagram of one embodiment or aspect of a system and method for task-based teleconference management.

For purposes of the description hereinafter, the terms "upper", "lower", "right", "left", "vertical", "horizontal", "top", "bottom", "lateral", "longitudinal," and derivatives thereof shall relate to non-limiting embodiments as they are oriented in the drawing figures. However, it is to be understood that non-limiting embodiments may assume various alternative variations and step sequences, except where expressly specified to the contrary. It is also to be understood that the specific devices and processes illustrated in the attached drawings, and described in the following specification, are simply exemplary embodiments. Hence, specific dimensions and other physical characteristics related to the embodiments disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partly on" unless explicitly stated otherwise.

Some non-limiting embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. Any known electronic communication protocols and/or algorithms may be used such as, for example, TCP/IP (including HTTP and other protocols), WLAN (including 802.11 and other radio frequency-based protocols and methods), analog transmissions, cellular networks (e.g., Global System for Mobile Communications (GSM), Code Division Multiple Access (CDMA), Long-Term Evolution (LTE), Worldwide Interoperability for Microwave Access (WiMAX), etc.), and/or the like. It will be appreciated that numerous other arrangements are possible.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices.

As used herein, the term "computing device" may refer to one or more electronic devices that are configured to directly or indirectly communicate with or over one or more networks. The computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a mobile device, such as a desktop computer. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.).

As used herein, the term "transaction service provider" may refer to an entity that receives transaction authorization requests from merchants or other entities and provides guarantees of payment, in some cases through an agreement between the transaction service provider and an issuer. For example, a transaction service provider may include a payment network, such as Visa®, MasterCard®, American Express®, or any other entity that processes transactions. As used herein "transaction service provider system" may refer to one or more systems operated by or operated on behalf of a transaction service provider, such as a transaction service provider system executing one or more software applications associated with the transaction service provider. In some non-limiting embodiments, a transaction service provider system may include one or more servers operated by or operated on behalf of a transaction service provider.

As used herein, the term "server" or "server computer" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., POS devices, directly or indirectly communicating in the network environment may constitute a "system," such as a teleconference system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to a system, method, and computer program product for task-based teleconference management. The described arrangement of network architecture and components therein is configured to provide an improved teleconferencing ecosystem, particularly for identifying and resolving tasks based on relevant groups for resolving these tasks. The present disclosure provides for automatically determining groups associated with individuals of an organization, and organizing the individuals as teleconference participants according to associated groups. The present disclosure further provides for primary and one or more secondary teleconference sessions, to allow parallel discussions in real-time, with participant tracking and conversation recording to generate reviewable and analyzable logs. Moreover, the present disclosure provides for monitoring of emergencies (e.g., incidents requiring tasks to be resolved), identification of tasks based on emergencies, identification of groups based on tasks, and identification of prospective teleconference participants based on groups. Such a determination may happen in real-time with emergency detection, ensuring that all necessary groups are represented in a teleconference, and the most priority individuals are connected to a teleconference first. As such, there is reduced latency in resolving technical system issues, improved salience in conference participation, and improved efficiency in allocating computer resources to teleconference connections.

With specific reference to FIG. 1, and in some non-limiting embodiments or aspects, provided is a system 100 for task-based teleconference management. One or more individuals 101 of an organization 106 (e.g., a collection of individuals) may desire to participate in a teleconference (e.g., an audio and/or video communication between two or more individuals 101). The system 100 includes a teleconference system 110 for initiating a teleconference bridge 112 (e.g., a computer-implemented link between multiple points of communication), by which one or more teleconference participants 102 may communicate with one another, through a network 108 (e.g., a local area network, the Internet, etc.). Each teleconference participant 102 may have a computing device 104 for sending communications through the network 108 to the teleconference system 110 and receiving communications from the teleconference system 110 through the network 108. The teleconference system 110 may initiate a teleconference bridge 112 and generate a primary teleconference session 114 hosted by the teleconference bridge 112. The teleconference system 110 may further generate one or more secondary teleconference sessions 116 hosted by the teleconference bridge 112. The teleconference system 110 may connect one or more teleconference participants 102 to the teleconference bridge 112 in a primary teleconference session 114 and/or one or more secondary teleconference sessions 116.

The teleconference system 110 may receive a participant identifier (e.g., a name, a number, a code, a hash, etc.) for each of the teleconference participants 102. Based at least partially on a participant identifier for each teleconference participant 102, the teleconference system 110 may determine an association of one or more groups (e.g., teams, departments, resources, etc.) with each teleconference participant 102. The participant identifier may include a direct key reference to one or more groups. The teleconference system 110 may also communicate with a database 118 to perform a lookup of one or more groups based on the participant identifier. The database 118 may store data of one or more groups and one or more individuals associated with each group. Identification of individuals 101 and associated groups of teleconference participants 102 need not be predicated on individuals 101 using specific types of teleconference applications or web portals. The described systems herein may be platform agnostic and use one or more participant identifiers. One or more participant identifiers may be determined based on a means of a teleconference participant 102 connecting to a teleconference bridge 112 (e.g., mobile application, desktop application, web browser, telephone with dial-tone multi-frequency signaling, etc.). For example, a participant identifier may include or be based on a phone number, a device address, a network address, and/or the like, and a participant identifier may also be input by a teleconference participant 102 using their computing device 104. In this manner, teleconference participants 102 may connect to the same teleconference bridge 112 and teleconference sessions 114, 116 by using computing devices 104 that are varied in device type (e.g., telephone, smartphone, desktop, tablet), channel of communication (e.g., telephone, internet, etc.), and communication protocol. It will be appreciated that interoperability is improved through cross-platform teleconferencing.

The teleconference system 110 may generate display data configured to cause a computing device, such as a computing device 104 of a teleconference participant 102, to display a control interface depicting the primary teleconference session 114 having a set of one or more groups of teleconference participants 102. Depicted in further detail in FIG. 3, one or more groups may be selected from a plurality of predetermined groups based on task data. A task may include any intended action and/or issue to be resolved that includes one or more steps (e.g., mental, physical, etc.) for completion. While "to be resolved" is used herein to convey the subject of a teleconference as being a task, it will be appreciated that the subject task may not, in fact, be resolved over the course of the conducted teleconference. Teleconference participants 102, in response to one or more tasks, may communicate with one another to discuss how to resolve the one or more tasks. Task data may include resource data specifying one or more groups to be involved in completion of the task, time data associated with a time period for resolving the task, personnel data associated with required individuals for task resolution, emergency data detailing one or more aspects of an associated emergency, and/or the like. The teleconference system 110 may further generate labels (e.g., names, pictures, numbers, or other identifiers) of each of the plurality of teleconference participants that are distinguished visually to identify the at least one group associated with the teleconference participant. Visual distinctions may include label location (e.g., in, on, or next to a group identifier), color (e.g., categorized by group), symbol (e.g., designating a group), size, font, style, and/or the like.

Any given teleconference, including a primary teleconference session 114 and optionally including one or more secondary teleconference sessions 116, may be associated with one or more teleconference manager. A teleconference may be initiated by one or more teleconference participants 102. A teleconference may also be prompted automatically by a teleconference system 110. A teleconference manager may include a teleconference participant 102 provided with controls to create secondary teleconference sessions 116, move teleconference participants 102 from one teleconference session 114, 116 to another, view teleconference data, connect or disconnect teleconference participants 102, and/or the like. The teleconference manager may participate merely to facilitate and may not be visually represented with other teleconference participants 102. In response to receiving input (e.g., key, button, mouse, touch, gesture, etc.) by a teleconference manager, the teleconference system 110 may generate one or more secondary teleconference sessions 116. The teleconference system 110 may generate display data configured to cause a control interface on a display of one or more computing device 104 to depict the secondary teleconference session including a subset of a plurality of teleconference participants 102. Each teleconference participant 102 may be presented with a unique interface depicting the primary teleconference session 114 and/or the secondary teleconference session 116, or the same or substantially the same interface as one or more other teleconference participants 102. A secondary teleconference session 116 may include a subset of one or more teleconference participants 102 and allow the subset of teleconference participants 102 to conduct a conversation in parallel to the primary teleconference session 114 and one or more other secondary teleconference sessions 116.

The teleconference system 110 may record primary audio data of the primary teleconference session 114 and store the primary audio data in a database 118. The teleconference system 110 may further record secondary audio data of the one or more secondary teleconference sessions 116 and store the secondary audio data in a database 118. The primary audio data of the primary teleconference session 114 may be stored in the database 118 in association with the secondary audio data of the one or more secondary teleconference sessions 116. The teleconference system 110 may generate display data configured to cause a control interface of a display of one or more computing devices 104 to depict visual representations of the primary audio data and the secondary audio data in association with depictions of the primary teleconference session 114 and the one or more secondary teleconference sessions 116, respectively. The visual representations of audio data may include one or more icons, images, links, media players, and/or the like for allowing a teleconference participant 102 to play back at least a portion of the primary audio data and/or the secondary audio data. In response to receiving a user input (e.g., key, button, mouse, touch, gesture, etc.) by a teleconference participant 102, the teleconference system 110 may cause a computing device 104 of the teleconference participant 102 to play back at least a portion of audio data, and/or provide at least a portion of audio data for playing back, to the teleconference participant 102 by an audio output of the computing device 104.

As described above, the teleconference system 110 may determine a set of groups based on task data of a task to be resolved. The teleconference system 110 may identify one or more empty groups of the set of groups that include no teleconference participants 102. The teleconference system 110 may determine one or more individuals 101 of the organization 106 associated with the one or more empty groups. The teleconference system 110 may perform a lookup of individuals 101 associated with the empty groups. A given group may be associated with a list of individuals in priority order, representing which individuals should be attempted to be connected first. The teleconference system 110 may connect one or more individuals 101 as new teleconference participants 102 so that one or more empty groups are no longer empty.

The system 100 may also include an emergency system monitor 120, e.g., a server communicating with one or more hardware or software components configured to trigger an alert if one or more detected issues arise. The monitored system may be a computer-network system providing one or more services, such as a telecommunications network, a transaction service provider system, an electronic marketplace, and/or the like, in which case an emergency might include a failure of one or more processes associated therewith. An emergency may also include any predefined and detectable condition (e.g., computer, environmental, mechanical, etc.) that, when detected, is associated with one or more tasks to resolve to address the detected predefined condition. "Emergency" may also be referred to herein as "system emergency," which may be understood to emphasize the relationship of an emergency to a computer-implemented task-based teleconference management system. The emergency may be associated with a system of the organization 106. The emergency system monitor 120 and the teleconference system 110 may be partially or completely coextensive. In response to detection of an emergency, the teleconference system 110 may determine one or more tasks to be resolved based on the emergency. Further, in response to detecting the emergency, the teleconference system 110 may generate a primary teleconference session 114 and connect one or more teleconference participants 102. In such a manner, individuals 101 of an organization 106 may be automatically identified and communicatively connected based on groups of a task of an identified emergency.

The one or more tasks to be resolved in response to an emergency may be determined from a plurality of predetermined tasks. The teleconference system 110 may receive task data from a database 118 that includes one or more emergency identifiers associated with one or more tasks. The database 118 may store relational connections between individuals 101, groups, tasks, and emergencies. For example, the database 118 may include one-to-one, one-to-many, and/or many-to-many relational connections of individuals 101 to groups, groups to tasks, and tasks to emergencies. Once one or more groups are identified as being associated with a given task, the teleconference system 110 may proceed to attempt to connect individuals 101 of each group in priority order. The teleconference system 110 may automatically sequentially request a communicative connection from the highest priority to the lowest priority individual 101 associated with a group, until an individual 101 of the group accepts the communicative connection. If no individuals of a given group accept the communicative connection, the teleconference system 110 may restart the sequential request process (one or more times) at the highest priority and continue back through until an individual 101 accepts the communicative connection. If no individuals of a group accept a communicative connection, a teleconference manager may be notified by the teleconference system 110 upon generation of the primary teleconference session 114 that a given group is empty and no individuals 101 responded.

Figure 2:
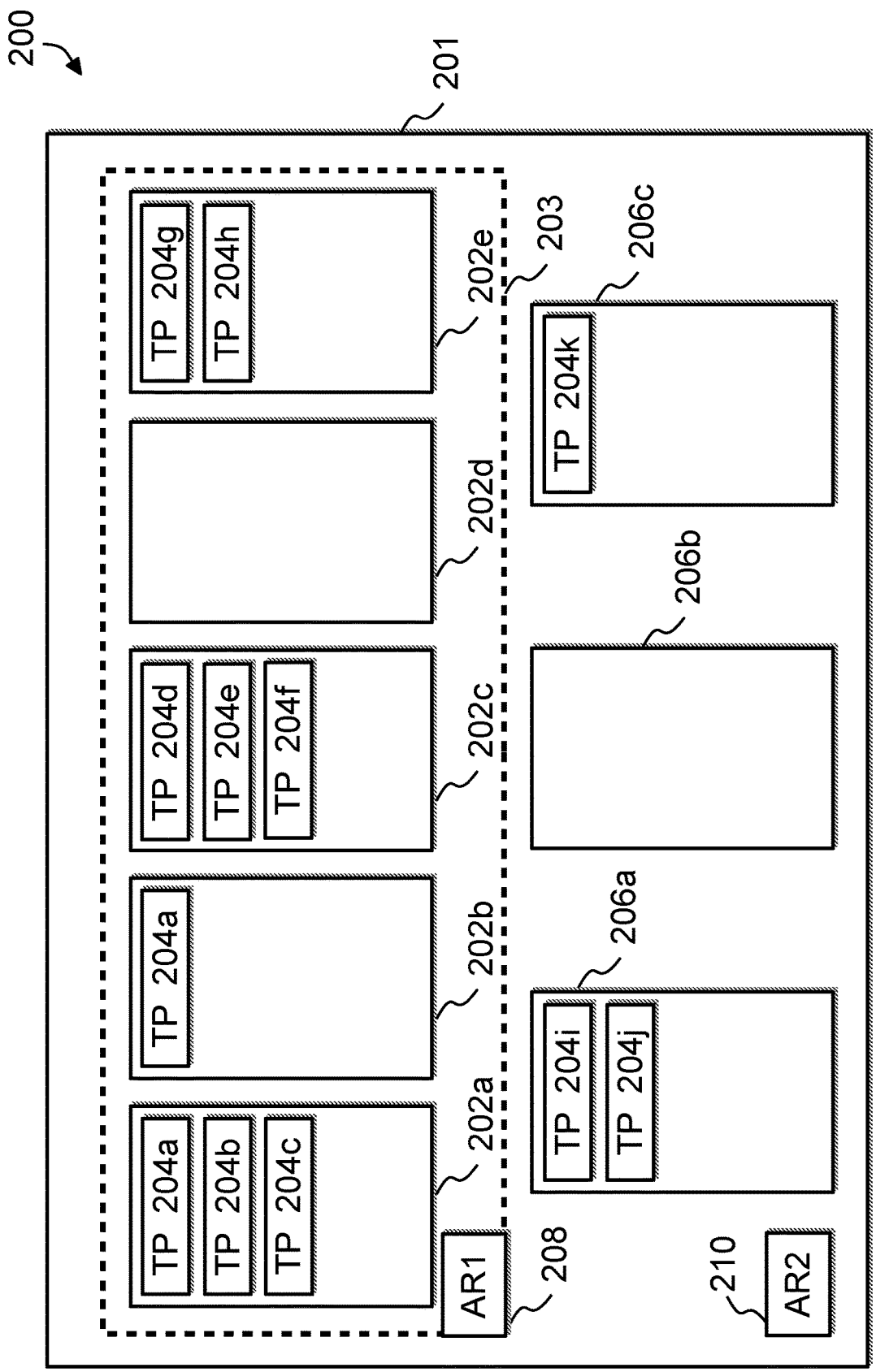
FIG. 2 is a schematic diagram of one embodiment or aspect of a system and method for task-based teleconference management.

With specific reference to FIG. 2, and in some non-limiting embodiments or aspects, depicted is a display 200 for task-based teleconference management. The display includes an interface 201 having a plurality of group fields 202a-202e visually represented as each having zero or more teleconference participant labels 204 therein. A teleconference participant label 204 visually represents the presence of a teleconference participant in a given teleconference session and/or group. A teleconference participant label 204 may be associated with one or more group fields 202a-202e in a primary teleconference session area 203. A group field 202 visually represents a group of an organization to which one or more individuals may belong that is involved in a given teleconference. While five group fields 202a-202e of a primary teleconference session are depicted for illustrative purposes, it will be appreciated that one or more group fields 202 may be included in a primary teleconference session. Further depicted are secondary teleconference session areas 206a-206c having one or more teleconference participant labels 204 therein, to indicate where teleconference participants have switched to communicate in one or more secondary teleconference sessions. While three secondary teleconference session areas 206a-206c are depicted for illustrative purposes, it will be appreciated that zero or more secondary teleconference session areas 206 may be included in the interface 201, corresponding to zero or more generated secondary teleconference sessions.

When a teleconference bridge is initiated and a primary teleconference session is hosted by the teleconference bridge, the interface 201 may be depicted on one or more computing devices of one or more teleconference participants. The interface 201 may first display a primary teleconference session area 203. For a teleconference initiated by individuals of an organization, the primary teleconference session area 203 may populate with group fields 202 associated with participant identifiers as teleconference participants are connected to the teleconference bridge. If a task to be resolved requires a group not represented by the group fields 202, a separate graphic may be displayed. Alternatively, the primary teleconference session area 203 may initially depict all relevant group fields 202 associated with a task to be resolved and may visually group teleconference participant labels 204 with related group fields 202 based on participant identifiers as teleconference participants are connected to the teleconference bridge.

A teleconference manager may input, via the interface 201, a command to generate a new secondary teleconference session. In response, the teleconference system may generate a new secondary teleconference session and a new secondary teleconference session area 206 may be depicted in the interface 201. The interface 201 on a computing device for each teleconference participant may similarly be updated when a new secondary teleconference session area 206 is generated. The group fields 202 of the primary teleconference session area 203 may depict only teleconference participants who are in a communication channel of the primary teleconference session. If teleconference participants switch communication channels from one teleconference session to another (in response to input from the teleconference participant or another), an associated teleconference participant label 204 may be moved to or duplicated in a corresponding teleconference session area 203, 206a-206c. To indicate a teleconference participant's representation in a group despite moving to a secondary teleconference session, teleconference participant labels 204 may be color coordinated with a particular group field 202, or a visual indicator may remain in a group field 202 to indicate the teleconference participant's presence in the teleconference but in a secondary teleconference session. Such a visual indicator may include a faded/shadow label, or a label with another shape, color, font, size, and/or the like in its group field 202. Alternatively, the groups 202 of the primary teleconference session area 203 may depict teleconference participants present in either the primary teleconference session or the secondary teleconference sessions, in which case a same teleconference participant label 204 may appear in a group 202 and in a secondary teleconference session area 206.

The teleconference system may record primary audio data of a primary teleconference session and/or secondary audio data of one or more secondary teleconference sessions. The stored audio data may be played back on a computing device associated with the display 200 depicting the interface 201 in response to user selection of a visual representation of the primary audio data 208 or a visual representation of the secondary audio data 210. A visual representation of audio data may include, but is not limited to, one or more icons, images, links, media players, and/or the like.

As described above, the teleconference system 110 may determine a set of groups having group fields 202 based on task data of a task to be resolved. The teleconference system 110 may identify one or more empty groups of the set of groups that include no teleconference participants, illustrated as empty group field 202*d*. The teleconference manager may also make such an identification by visually scanning the depicted group fields 202. Based on the identification of an empty group, the teleconference manger, either automatically or in response to user input, may attempt to connect an individual of the organization to the teleconference so that each group is represented by at least one teleconference participant.

Figure 3:
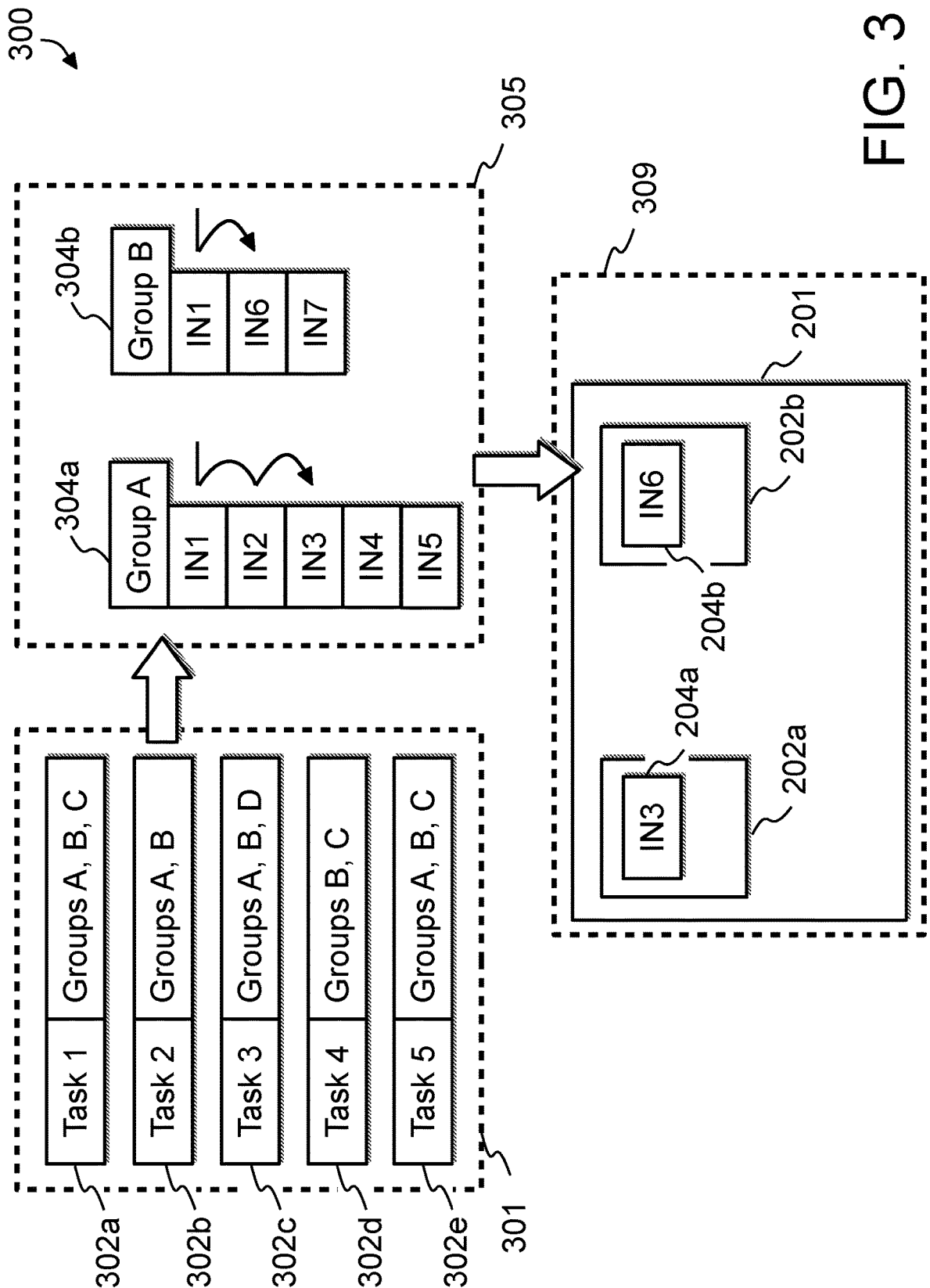
FIG. 3 is a phase diagram of one embodiment or aspect of a system and method for task-based teleconference management.

With specific reference to FIG. 3, and in some non-limiting embodiments or aspects, depicted is a method 300 for task-based teleconference management. The method 300 may be carried out by a teleconference system. In a first phase 301, the teleconference system may identify a task to be resolved. The task may be input by a teleconference manager or user, automatically determined based on teleconference participants who have connected to a teleconference, or may be generated in response to detection of an emergency. A set of task records 302*a*-302*e* may be stored in a database in association with one or more groups. Task records 302*a*-302*e* may be predetermined and stored based on common or anticipated tasks to complete. While five task records 302*a*-302*e* are depicted for illustrative purposes, it will be appreciated that one or more task records 302 may be stored in a database. Any combination of one or more groups may be associated with a task in a given task records 302. For illustrative purposes, Task 2 302*b* is identified by a teleconference system as a subject task for teleconference. In response, the teleconference system may initiate a teleconference bridge and generate a primary teleconference session hosted by the teleconference bridge.

In a second phase 305, the teleconference system may determine group records 304*a*, 304*b* associated with the identified task record 302*b*. One or more individuals may be associated with a given group of a group records. For illustrative purposes, Group A 304*a* is shown associated with five individuals IN1, IN2, IN3, IN4, and IN5, and Group B 304*b* is shown associated with three individuals IN1, IN6, and IN7. As shown, it may be possible for one individual to belong to more than one group (IN1), but the group records 304*a*, 304*b* may alternatively be configured to have non-overlapping membership. The individuals of each group record 304*a*, 304*b* may be provided in a priority order or may be associated with a priority level. The teleconference system may automatically request a communicative connection to the highest priority individual of a group records 304*a*, 304*b*. If the highest priority individual does not accept the communicative connection (e.g., answer an automatically dialed call), then the teleconference system may automatically request a communicative connection to the next highest priority individual, and so on. If no individuals of a group record 304*a*, 304*b* accept the communicative connection, the teleconference system may either stop sending requests or may loop back through the list of individuals. For illustrative purposes, the first two individuals of the record for Group A 304*a* are depicted as being contacted, but not connected. The third individual, IN3, is depicted as accepting the communicative connection. Similarly, the first individual of the record for Group B 304*b* is depicted as being contacted, but not connected. The second individual, IN6, is depicted as accepting the communicative connection.

In a third phase 309, one or more interfaces 201 may be generated and displayed on one or more computing devices of one or more teleconference participants. For illustrative purposes, an interface 201 is shown having two group fields 202*a*, 202*b*, which may correspond to the identified group records 304*a*, 304*b*. The individual associated with Group A that accepted the communicative connection is represented by a teleconference participant label 204*a* in a first group field 202*a* for Group A. The individual associated with Group B that accepted the communicative connection is represented by a teleconference participant label 204*b* in a second group field 202*b* for Group B. From this third phase 309, the connected individuals may conduct a teleconference, connect with additional teleconference participants, create secondary teleconference sessions, and/or the like. If a group was identified as relating to Task 2 302*b* but no individual in that group was connected to the teleconference bridge, then a corresponding group field 202*a*, 202*b* would be empty and teleconference participants would be able to quickly ascertain the unrepresented group.

Figure 4:
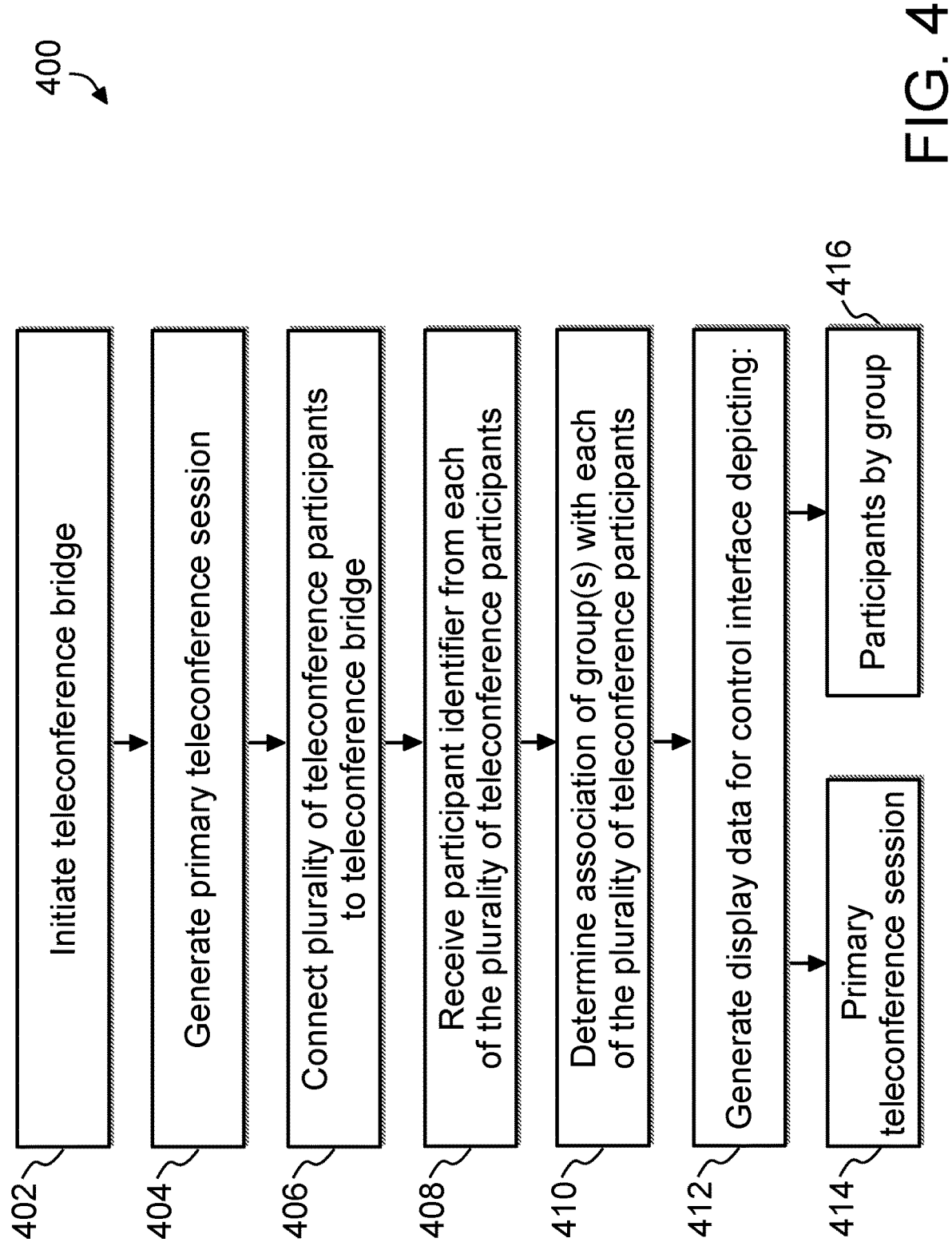
FIG. 4 is a process diagram of one embodiment or aspect of a system and method for task-based teleconference management.

With specific reference to FIG. 4, and in some non-limiting embodiments or aspects, depicted is a method 400 for task-based teleconference management. The method 400 may be carried out by one or more processors of a teleconference system, an emergency system monitor, a computing device, and/or another system server. One or more steps may precede or follow the steps of the method 400. In step 402, the teleconference system may initiate a teleconference bridge, to which one or more individuals may be connected via computing devices as teleconference participants. In step 404, the teleconference system may generate a primary teleconference session hosted by the teleconference bridge. In step 406, the teleconference system may connect to the teleconference bridge a plurality of teleconference participants from a plurality of individuals of an organization. The teleconference system may solicit, automatically or in response to user input, communicative connections to the individuals. Individuals may also connect to the teleconference bridge without prompting by the teleconference system using a teleconference interface. Individuals may be assigned/given an identifier and/or a code to access and connect to the teleconference bridge. In step 408, the teleconference system may receive a plurality of participant identifiers including a participant identifier for each of the plurality of teleconference participants.

In step 410, the teleconference system may determine an association of at least one group of a plurality of predetermined groups of the organization with each of the plurality of teleconference participants. The association may be determined at least partly based on the plurality of participant identifiers. For example, a participant identifier of a teleconference participant may be stored as associated with one or more groups in a database, and the teleconference system may determine the one or more groups associated with the teleconference participant by communicating with the database. In step 412, the teleconference system may generate display data configured to cause a computing device to display a control interface for the teleconference. One or more interfaces may be displayed on one or more computing devices of one or more teleconference participants. The display data may cause the interface to depict the primary teleconference session in step 414, wherein the primary teleconference session has a set of one or more groups of teleconference participants. The set of groups may be selected from a plurality of predetermined groups based on task data of a task to be resolved, and each of the plurality of teleconference participants may be represented in the set of groups based on the one or more groups with which the teleconference participant is associated. The display data may also cause the interface to depict, in step 416, labels of each of the plurality of teleconference participants distinguished visually to identify the one or more groups associated with the teleconference participant.

Figure 5:
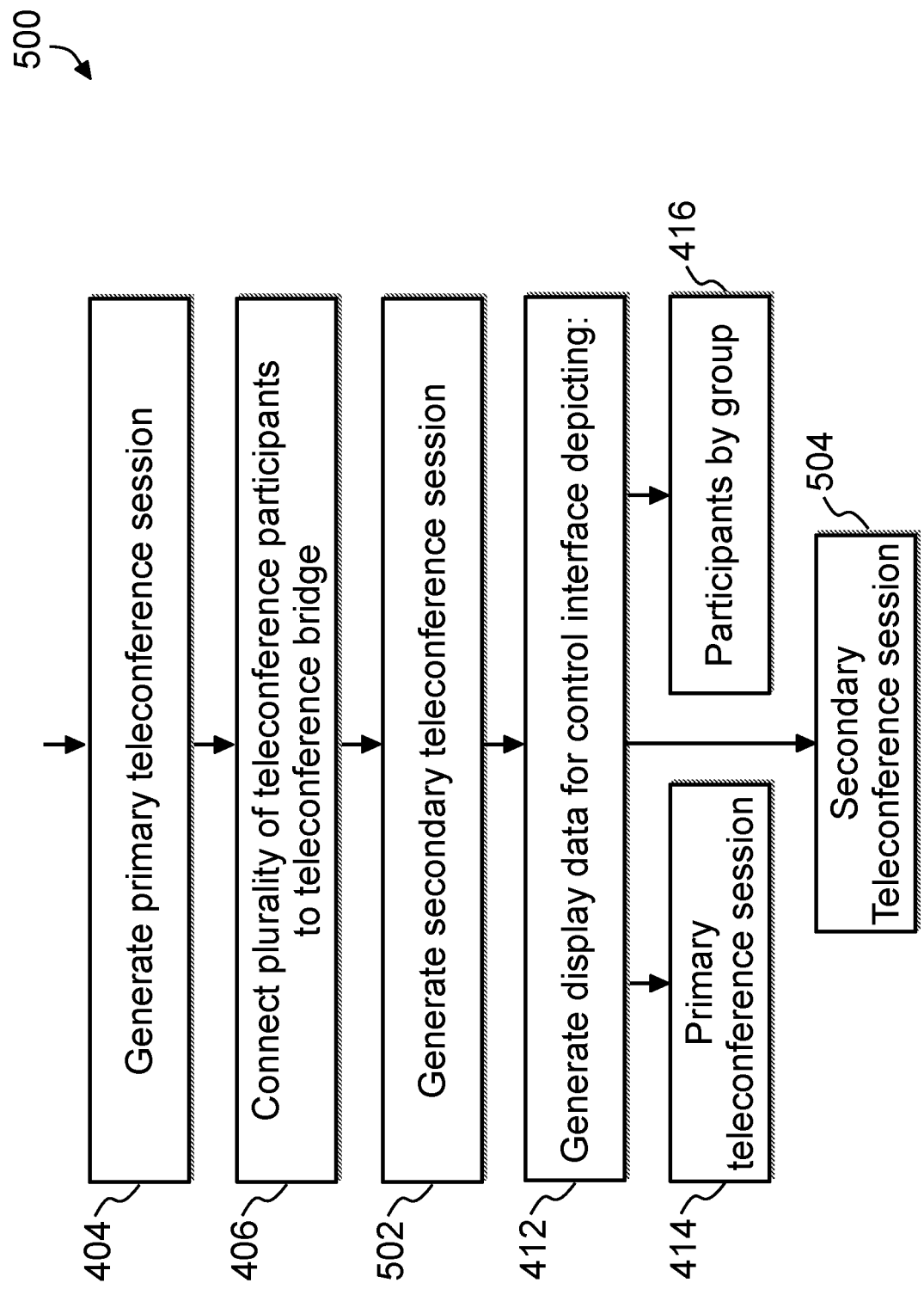
FIG. 5 is a process diagram of one embodiment or aspect of a system and method for task-based teleconference management.

With specific reference to FIG. 5, and in some non-limiting embodiments or aspects, depicted is a method 500 for task-based teleconference management. The method 500 may be carried out by one or more processors of a teleconference system, an emergency system monitor, a computing device, and/or another system server. One or more steps may precede or follow the steps of the method 500. In step 404, the teleconference system may generate a primary teleconference session hosted by the teleconference bridge. In step 406, the teleconference system may connect to the teleconference bridge a plurality of teleconference participants from a plurality of individuals of an organization. In step 502, the teleconference system may generate a secondary teleconference session. A subset of the plurality of teleconference participants may be associated with the secondary teleconference session and switched to a communication channel separate from that of the primary teleconference session. In step 412, the teleconference system may generate display data configured to cause a computing device to display a control interface for the teleconference. The display data may cause the interface to depict the primary teleconference session in step 414, wherein the primary teleconference session has a set of one or more groups of teleconference participants. The display data may also cause the interface to depict, in step 416, labels of each of the plurality of teleconference participants distinguished visually to identify the one or more groups associated with the teleconference participant. The display data may further cause the interface to depict, in step 504, the secondary teleconference session including the subset of the plurality of teleconference participants. Steps 502 and 504 may be repeated for one or more secondary teleconference sessions.

Figure 6:
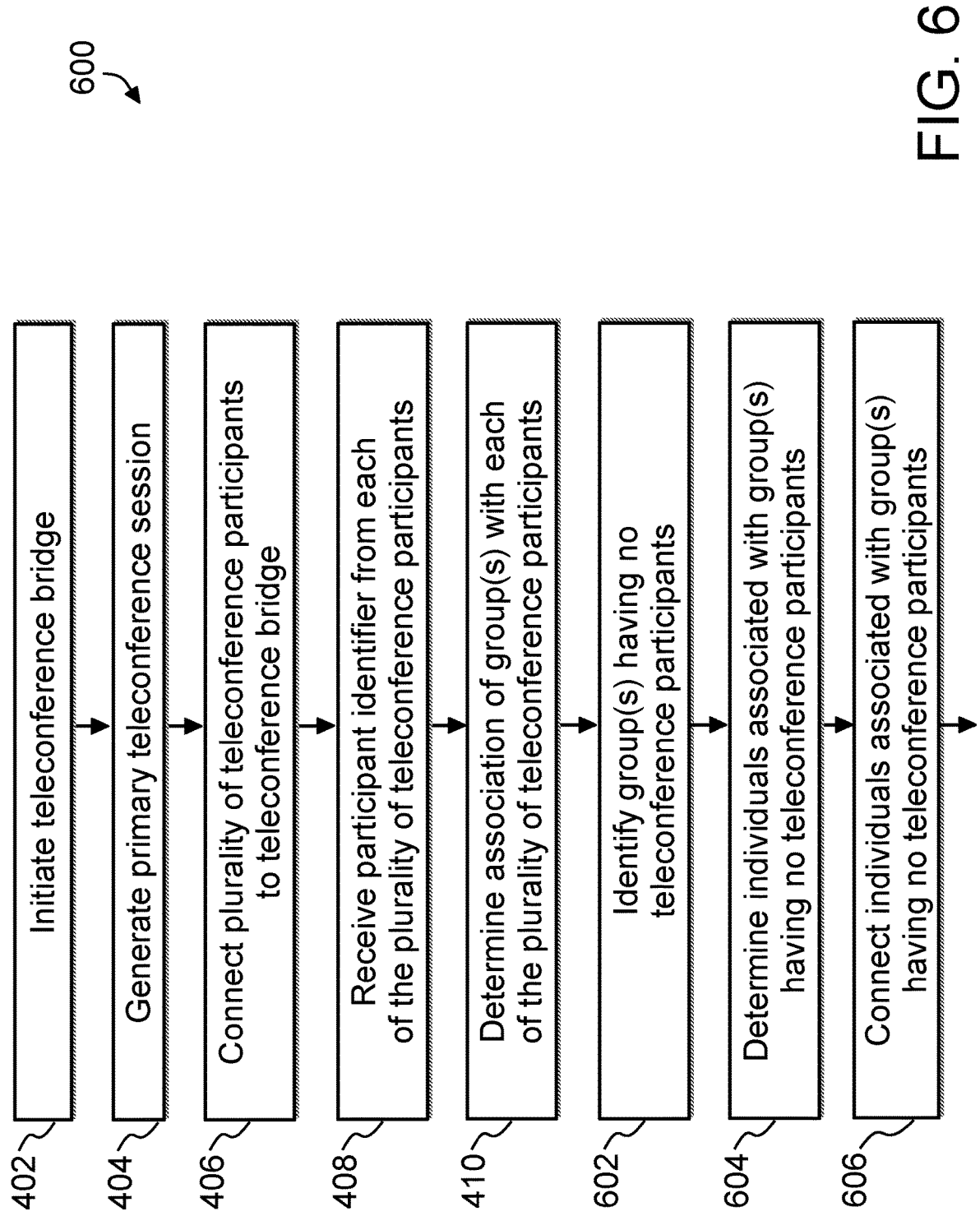
FIG. 6 is a process diagram of one embodiment or aspect of a system and method for task-based teleconference management.

With specific reference to FIG. 6, and in some non-limiting embodiments or aspects, depicted is a method 600 for task-based teleconference management. The method 600 may be carried out by one or more processors of a teleconference system, an emergency system monitor, a computing device, and/or another system server. One or more steps may precede or follow the steps of the method 600. In step 402, the teleconference system may initiate a teleconference bridge, to which one or more individuals may be connected via computing devices as teleconference participants. In step 404, the teleconference system may generate a primary teleconference session hosted by the teleconference bridge. In step 406, the teleconference system may connect to the teleconference bridge a plurality of teleconference participants from a plurality of individuals of an organization. In step 408, the teleconference system may receive a plurality of participant identifiers including a participant identifier for each of the plurality of teleconference participants.

In step 410, the teleconference system may determine an association of at least one group of a plurality of predetermined groups of the organization with each of the plurality of teleconference participants. In step 602, the teleconference system may identify one or more groups of the set of groups having no teleconference participants. The empty groups may have once had teleconference participants that at some point left the primary teleconference session or the teleconference altogether. In step 604, the teleconference system may determine one or more individuals of the plurality of individuals of the organization that are associated with the one or more empty groups. In step 606, the teleconference system may connect the one or more individuals of the plurality of individuals of the organization as new teleconference participants to the primary teleconference session. The connection of additional individuals of the empty groups may be conducted automatically by the teleconference system based on a priority order or level of the individual in group records.

With specific reference to FIG. 7, and in some non-limiting embodiments or aspects, depicted is a method 700 for task-based teleconference management. The method 700 may be carried out by one or more processors of a teleconference system, an emergency system monitor, a computing device, and/or another system server. One or more steps may precede or follow the steps of the method 700. In step 702, the emergency system monitor may detect a system emergency. For example, a fraud analysis service of a transaction service provider system may be detected as unintentionally offline. In step 704, the emergency monitor system and/or the teleconference system may determine at least one task to be resolved based on the detected system emergency. For example, in the case of a fraud analysis service going offline, the task to be completed may be to move operation of the fraud analysis service to a set of backup servers.

In step 402, in response to the detection of the system emergency, the teleconference system may initiate a teleconference bridge, to which one or more individuals may be connected via computing devices as teleconference participants. In step 404, in response to the detection of the system emergency, the teleconference system may generate a primary teleconference session hosted by the teleconference bridge. In step 706, the teleconference system may, in response to detecting the system emergency, determine one or more groups associated with one or more tasks to be resolved as associated with the detected system emergency. The one or more tasks may be determined from a plurality of predetermined tasks and may be associated with one or more groups of the plurality of predetermined groups of the organization. Each group may also be associated with a list of individuals to be connected to the teleconference bridge in priority order. In step 708, the teleconference system may, in response to the detection of the system emergency, automatically sequentially request a communicative connection to an individual of a respective list of individuals for each group of the one or more groups associated with the task, in priority order, until an individual in the respective list of individuals accepts the communicative connection. In such a manner, while organization personnel may yet be unaware of the system emergency, the emergency system monitor and/or the teleconference system may be underway identifying tasks to be resolved, groups that are required to complete such tasks, and priority individuals to connect on a teleconference to address the emergency.

Although the disclosure has been described in detail for the purpose of illustration based on what is currently considered to be the most practical and non-limiting embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method, comprising:
   detecting, with at least one processor, a system emergency comprising a failure of at least one process of a computer-network system;

initiating, with at least one processor, a teleconference bridge;

determining, with at least one processor, at least two tasks to address the system emergency, each task of the at least two tasks comprising at least one step for completion;

in response to detecting the system emergency, generating, with at least one processor, a primary teleconference session hosted by the teleconference bridge and connecting to the teleconference bridge, with at least one processor, based on the at least two tasks, a plurality of teleconference participants from a plurality of individuals of an organization;

receiving, with at least one processor, a plurality of participant identifiers comprising a participant identifier for each of the plurality of teleconference participants;

determining, with at least one processor, an association of at least one group of a plurality of predetermined groups of the organization with each of the plurality of teleconference participants based at least partly on the plurality of participant identifiers; and generating, with at least one processor, display data configured to cause a computing device to display a control interface depicting: (i) the primary teleconference session having a set of groups of teleconference participants, the set of groups selected from the plurality of predetermined groups based on task data, and each of the plurality of teleconference participants represented in the set of groups based on the at least one group with which the teleconference participant is associated; and (ii) labels of each of the plurality of teleconference participants distinguished visually to identify the at least one group associated with the teleconference participant.

2. The method of claim 1, further comprising:

in response to input by a teleconference manager, generating, with at least one processor, a secondary teleconference session including a subset of the plurality of teleconference participants; and generating, with at least one processor, display data configured to cause the control interface to depict the secondary teleconference session including the subset of the plurality of teleconference participants.

3. The method of claim 2, further comprising:

recording, with at least one processor, primary audio data of the primary teleconference session and secondary audio data of the secondary teleconference session;

storing, with at least one processor, the primary audio data in association with the secondary audio data;

generating, with at least one processor, display data configured to cause the control interface to depict visual representations of the primary audio data and the secondary audio data in association with depictions of the primary teleconference session and the secondary teleconference session, respectively; and in response to a user input, playing back, with at least one processor, the primary audio data, the secondary audio data, or a combination thereof.

4. The method of claim 1, further comprising:

identifying, with at least one processor, at least one group of the set of groups comprising no teleconference participants;

determining, with at least one processor, at least one individual of the plurality of individuals of the organization associated with the at least one group; and connecting, with at least one processor, the at least one individual as a new teleconference participant to the primary teleconference session.

5. The method of claim 1, wherein the at least two tasks to be resolved are determined from a plurality of predetermined tasks and are associated with at least one group of the plurality of predetermined groups of the organization, and wherein each of the at least one group is associated with a list of individuals of the plurality of individuals to be connected to the teleconference bridge in priority order.

6. The method of claim 5, further comprising, in response to detecting the system emergency, automatically sequentially requesting, with at least one processor and in priority order, a communicative connection to an individual of a respective list of individuals for each group of the at least one group until an individual in the respective list of individuals accepts the communicative connection.

7. A system comprising a server comprising at least one processor, the server programmed and/or configured to:

detect a system emergency comprising a failure of at least one process of a computer-network system;

initiate a teleconference bridge;

determine at least two tasks to address the system emergency, each task of the at least two tasks comprising at least one step for completion;

in response to detecting the system emergency, generate a primary teleconference session hosted by the teleconference bridge and connect to the teleconference bridge, based on the at least two tasks, a plurality of teleconference participants from a plurality of individuals of an organization;

receive a plurality of participant identifiers comprising a participant identifier for each of the plurality of teleconference participants;

determine an association of at least one group of a plurality of predetermined groups of the organization with each of the plurality of teleconference participants based at least partly on the plurality of participant identifiers; and generate display data configured to cause a computing device to display a control interface depicting: (i) the primary teleconference session having a set of groups of teleconference participants, the set of groups selected from the plurality of predetermined groups based on task data, and each of the plurality of teleconference participants represented in the set of groups based on the at least one group with which the teleconference participant is associated; and (ii) labels of each of the plurality of teleconference participants distinguished visually to identify the at least one group associated with the teleconference participant.

8. The system of claim 7, wherein the server is further programmed and/or configured to:

in response to input by a teleconference manager, generate a secondary teleconference session including a subset of the plurality of teleconference participants; and generate display data configured to cause the control interface to depict the secondary teleconference session including the subset of the plurality of teleconference participants.

9. The system of claim 7, wherein the server is further programmed and/or configured to:

identify at least one group of the set of groups comprising no teleconference participants;

determine at least one individual of the plurality of individuals of the organization associated with the at least one group; and connect the at least one individual as a new teleconference participant to the primary teleconference session.

10. The system of claim 7, wherein the at least two tasks to be resolved are determined from a plurality of predetermined tasks and are associated with at least one group of the plurality of predetermined groups of the organization, and wherein each of the at least one group is associated with a list of individuals of the plurality of individuals to be connected to the teleconference bridge in priority order.

11. The system of claim 10, wherein the server is further programmed and/or configured to, in response to detecting the system emergency, automatically sequentially request, in priority order, a communicative connection to an individual of a respective list of individuals for each group of the at least one group until an individual in the respective list of individuals accepts the communicative connection.

12. A computer program product comprising at least one non-transitory computer-readable medium including program instructions that, when executed by at least one processor, cause the at least one processor to:
 detect a system emergency comprising a failure of at least one process of a computer-network system;
 initiate a teleconference bridge;
 determine at least two tasks to address the system emergency, each task of the at least two tasks comprising at least one step for completion;
 in response to detecting the system emergency, generate a primary teleconference session hosted by the teleconference bridge and connect to the teleconference bridge, based on the at least two tasks, a plurality of teleconference participants from a plurality of individuals of an organization;
 receive a plurality of participant identifiers comprising a participant identifier for each of the plurality of teleconference participants;
 determine an association of at least one group of a plurality of predetermined groups of the organization with each of the plurality of teleconference participants based at least partly on the plurality of participant identifiers; and
 generate display data configured to cause a computing device to display a control interface depicting: (i) the primary teleconference session having a set of groups of teleconference participants, the set of groups selected from the plurality of predetermined groups based on task data, and each of the plurality of teleconference participants represented in the set of groups based on the at least one group with which the teleconference participant is associated; and (ii) labels of each of the plurality of teleconference participants distinguished visually to identify the at least one group associated with the teleconference participant.

13. The computer program product of claim 12, wherein the program instructions further cause the at least one processor to:
 in response to input by a teleconference manager, generate a secondary teleconference session including a subset of the plurality of teleconference participants; and
 generate display data configured to cause the control interface to depict the secondary teleconference session including the subset of the plurality of teleconference participants.

14. The computer program product of claim 13, wherein the program instructions further cause the at least one processor to:
 record primary audio data of the primary teleconference session and secondary audio data of the secondary teleconference session;
 store the primary audio data in association with the secondary audio data;
 generate display data configured to cause the control interface to depict visual representations of the primary audio data and the secondary audio data in association with depictions of the primary teleconference session and the secondary teleconference session, respectively; and
 in response to a user input, play back the primary audio data, the secondary audio data, or a combination thereof.

15. The computer program product of claim 12, wherein the program instructions further cause the at least one processor to:
 identify at least one group of the set of groups comprising no teleconference participants;
 determine at least one individual of the plurality of individuals of the organization associated with the at least one group; and
 connect the at least one individual as a new teleconference participant to the primary teleconference session.

16. The computer program product of claim 12, wherein the at least two tasks to be resolved are determined from a plurality of predetermined tasks and are associated with at least one group of the plurality of predetermined groups of the organization, and wherein each of the at least one group is associated with a list of individuals of the plurality of individuals to be connected to the teleconference bridge in priority order.

17. The computer program product of claim 16, wherein the program instructions further cause the at least one processor to, in response to detecting the system emergency, automatically sequentially request, in priority order, a communicative connection to an individual of a respective list of individuals for each group of the at least one group until an individual in the respective list of individuals accepts the communicative connection.

18. A system comprising:
 an emergency system monitor comprising at least one server comprising at least one processor, the emergency system monitor programmed and/or configured to, based on at least one predefined condition of a computer-network system being monitored by the emergency system monitor, detect a system emergency comprising a failure of at least one process of the computer-network system; and
 a teleconference system comprising at least one server comprising at least one processor, the teleconference system programmed and/or configured to, in response to detection of the system emergency:
  initiate a teleconference bridge;
  determine at least one task to address the system emergency based on the detected system emergency, each task of the at least one task comprising a plurality of steps, said each task determined from a plurality of predetermined tasks, and said each task associated with at least two groups of a plurality of predetermined groups of an organization, wherein each group of the at least two groups is associated with a list of individuals in a priority order for connection to the teleconference bridge;

generate a primary teleconference session hosted by the teleconference bridge;

connect, as a plurality of teleconference participants, at least one individual of the list of individuals of each group of the at least two groups to the teleconference bridge in the priority order of the list of individuals of said each group;

receive a plurality of participant identifiers comprising a participant identifier for each of the plurality of teleconference participants;

determine an association of each teleconference participant of the plurality of teleconference participants with a group of the at least two groups based at least partly on the participant identifier for said each teleconference participant; and generate display data configured to cause a computing device to display a control interface depicting: (i) the primary teleconference session; (ii) the at least two groups; (iii) each teleconference participant of the plurality of teleconference participants associated with a group of the at least two groups based on the association of said each teleconference participant; and (iv) a label for each teleconference participant of the plurality of teleconference participants distinguished visually to identify the association of said each teleconference participant.

* * * * *